(12) United States Patent
Wang (10) Patent No.: US 8,660,291 B2
(45) Date of Patent: Feb. 25, 2014

(54) SPEAKER DEVICE AND ELECTRONIC DEVICE HAVING THE SAME

(75) Inventor: Chih-Yi Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/604,438

(22) Filed: Sep. 5, 2012

(65) Prior Publication Data

US 2013/0156252 A1    Jun. 20, 2013

(30) Foreign Application Priority Data

Dec. 16, 2011   (TW) .............................. 100146862 A (51) Int. Cl.
*H04R 1/02* (2006.01)
*H04R 1/28* (2006.01)

(52) U.S. Cl.
CPC .............. *H04R 1/2888* (2013.01); *H04R 1/025* (2013.01)
USPC ......................................... 381/392; 381/386

(58) Field of Classification Search
USPC ......... 381/353, 354, 386, 387, 388, 389, 392, 381/398, 413, 87, 332, 333; 181/146, 150, 181/151, 160, 171, 172, 199; 361/679.34–679.36
See application file for complete search history.

(56) References Cited

U.S. PATENT DOCUMENTS

| 6,335,974 | B1 * | 1/2002 | Kunimoto | ...................... 381/306 |
| 2001/0028724 | A1 * | 10/2001 | Kowaki et al. | ................ 381/349 |
| 2003/0226712 | A1 * | 12/2003 | Nishikawa et al. | ........... 181/199 |
| 2005/0152570 | A1 * | 7/2005 | Yu et al. | ......................... 381/353 |
| 2008/0175705 | A1 | 7/2008 | Liu | |

FOREIGN PATENT DOCUMENTS

TW    I317242    11/2009

* cited by examiner

*Primary Examiner* — Tuan D Nguyen
(74) *Attorney, Agent, or Firm* — Muncy, Geissler, Olds & Lowe, P.C.

(57) ABSTRACT

A speaker device is disclosed. The speaker device is mounted in an electronic device that includes a plurality of positioning elements. The speaker device includes a speaker main body, at least one pair of buffer arms, a plurality of fixed elements, and a plurality of buffer members. One end of each buffer arms is connected to the speaker main body and located at the opposite sides of the speaker main body. The fixed elements is connected to the other end of each buffer arm and movably combined with each positioning element, such that the speaker main body is fixed in the electronic device. The members is mounted in between each fixed element and each positioning element, allowing the buffer arms and the buffer members to reduce vibration generated by the speaker main body passing to the electronic device when the speaker main body is vibrating.

24 Claims, 6 Drawing Sheets

SPEAKER DEVICE AND ELECTRONIC DEVICE HAVING THE SAME

BACKGROUND OF THE INVENTION

1. Field of the Invention

The present invention relates to a speaker device; more particularly, the present invention relates to a speaker device with a vibration-preventing function.

2. Description of the Related Art

Current laptop computers are all equipped with built-in speakers, such that users can listen to audio content without the need to carry any external playback device (such as a headset or earphone). However, because consumers demand higher and higher sound quality, the speaker not only has to satisfy the consumer in volume but also needs to provide a sub-woofer performance, which is the key factor in a consumer choosing a speaker.

However, the speaker with a better sub-woofer effect always generates more vibration during sound playback. Therefore, when the speaker is playing back, the vibration generated by the speaker may cause the computer body to generate vibration, or even cause the computer body to generate a co-vibration effect, which may reduce the read rate of a hard disk drive, thereby causing instability when the hard disk drive reads data or failure of the computer system.

As a result, in order to ensure stability and quality when the consumer operates the computer, a new test specification is developed in which the speaker is turned to its maximum volume to test the read rate of the hard disk drive, and at least 50% of the original read rate is required under the condition of vibration generation, so as to ensure the stability of system operations. However, currently, most computer systems cannot meet such requirements; therefore, there is a need to design a simpler and relatively easier-to-assemble speaker vibration-preventing mechanism, such that not only the test specification and outgoing quality requirements can be achieved but also unnecessary test costs and research and development time can be saved, thereby reducing the cost of developing machine types as well as increasing the efficiency of computer operation.

SUMMARY OF THE INVENTION

It is an object of the present invention to provide a speaker device with a vibration-preventing function.

It is another object of the present invention to provide an electronic device having a speaker device with a vibration-preventing function.

To achieve the abovementioned objects, the speaker device of the present invention is mounted in an electronic device, wherein the electronic device includes a plurality of positioning elements. The speaker device of the present invention comprises a speaker main body, at least one pair of buffer arms, a plurality of fixing elements, and a plurality of buffer members. One end of each of the buffer arms is connected to the speaker main body, and the pair of buffer arms are respectively and symmetrically located at opposite sides of the speaker main body. The plurality of fixing elements is respectively connected to the other end of each of the buffer arms, and is movably combined with each of the positioning elements so as to fix the speaker main body in the electronic device. The plurality of buffer members is respectively mounted between each of the fixing elements and each of the positioning elements. When the speaker main body generates vibration, the at least one pair of buffer arms and the plurality of buffer members absorb energy to reduce the amplitude of the vibration transmitted to the electronic device.

According to one embodiment of the present invention, the shape of the at least one pair of buffer arms is a zigzag shape, and each of the buffer members comprises a spring, a first magnet, and a second magnet. The spring is accommodated in each of the positioning elements located in an upper cover of the electronic device, such that when the speaker main body generates vibration, the elasticity of the spring can relieve the amplitude of the vibration. The first magnet is mounted to one end of each of the fixing elements, and the second magnet is mounted in each of the positioning elements located in a lower cover of the electronic device so as to correspond to the first magnet. The magnetisms of the opposing surfaces of the first magnet and the second magnet are the same; therefore, the repelling force generated due to two identical magnetisms of the two magnets can provide a magnetic force to relieve the vibration generated by the speaker main body.

According to another embodiment of the present invention, each of the buffer members comprises two airtight rings and two springs, wherein the springs are respectively mounted in each of the positioning elements, and the airtight rings are respectively mounted to two end portions of each of the fixing elements.

According to yet another embodiment of the present invention, the shape of the plurality of buffer arms is in a square wave form, and each buffer member comprises two springs, wherein each of the springs is respectively mounted in each of the positioning elements.

The electronic device provided by the present invention comprises a plurality of positioning elements and the above-mentioned speaker device.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
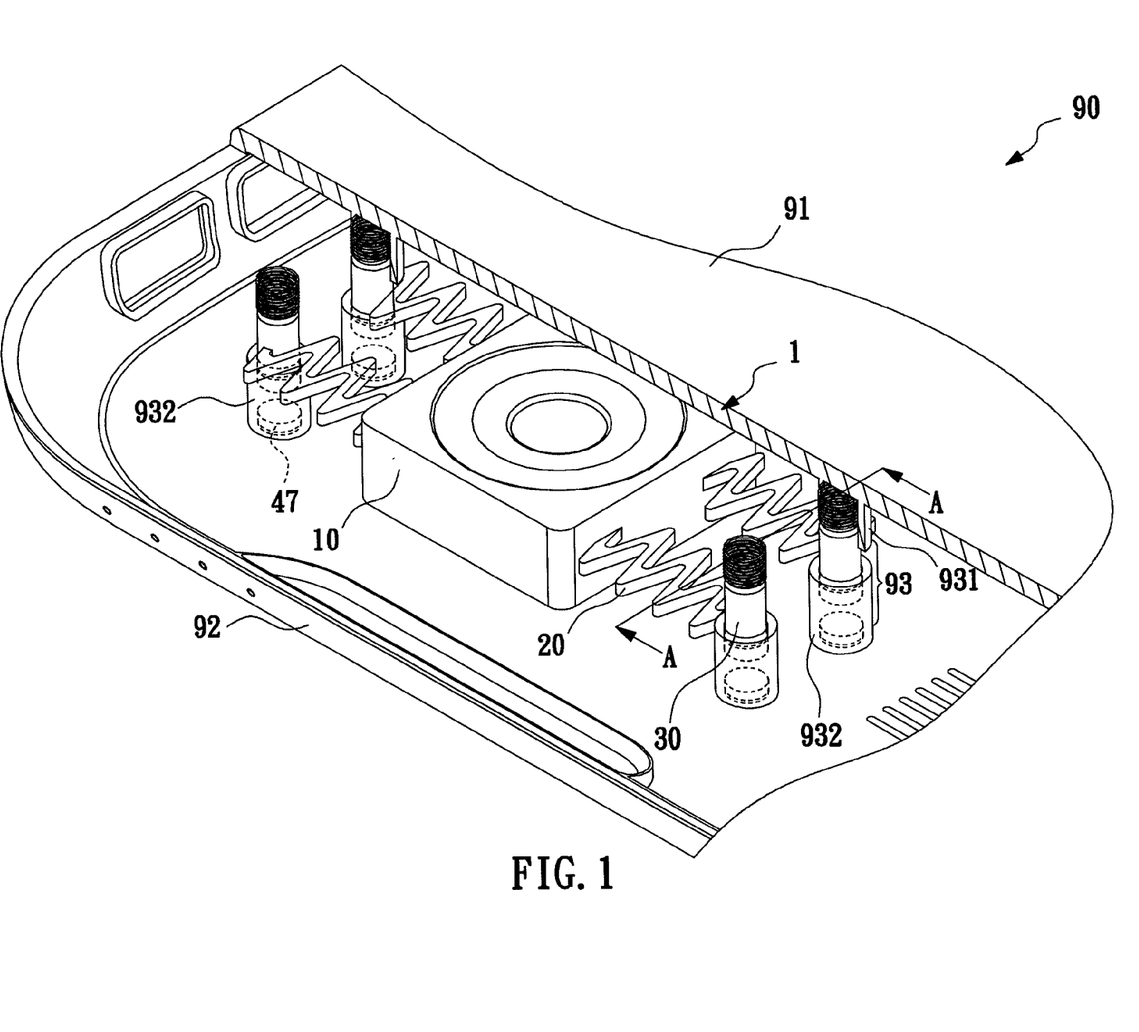
FIG. 1 illustrates a schematic drawing of a speaker device according to a first embodiment of the present invention.
Figure 2:
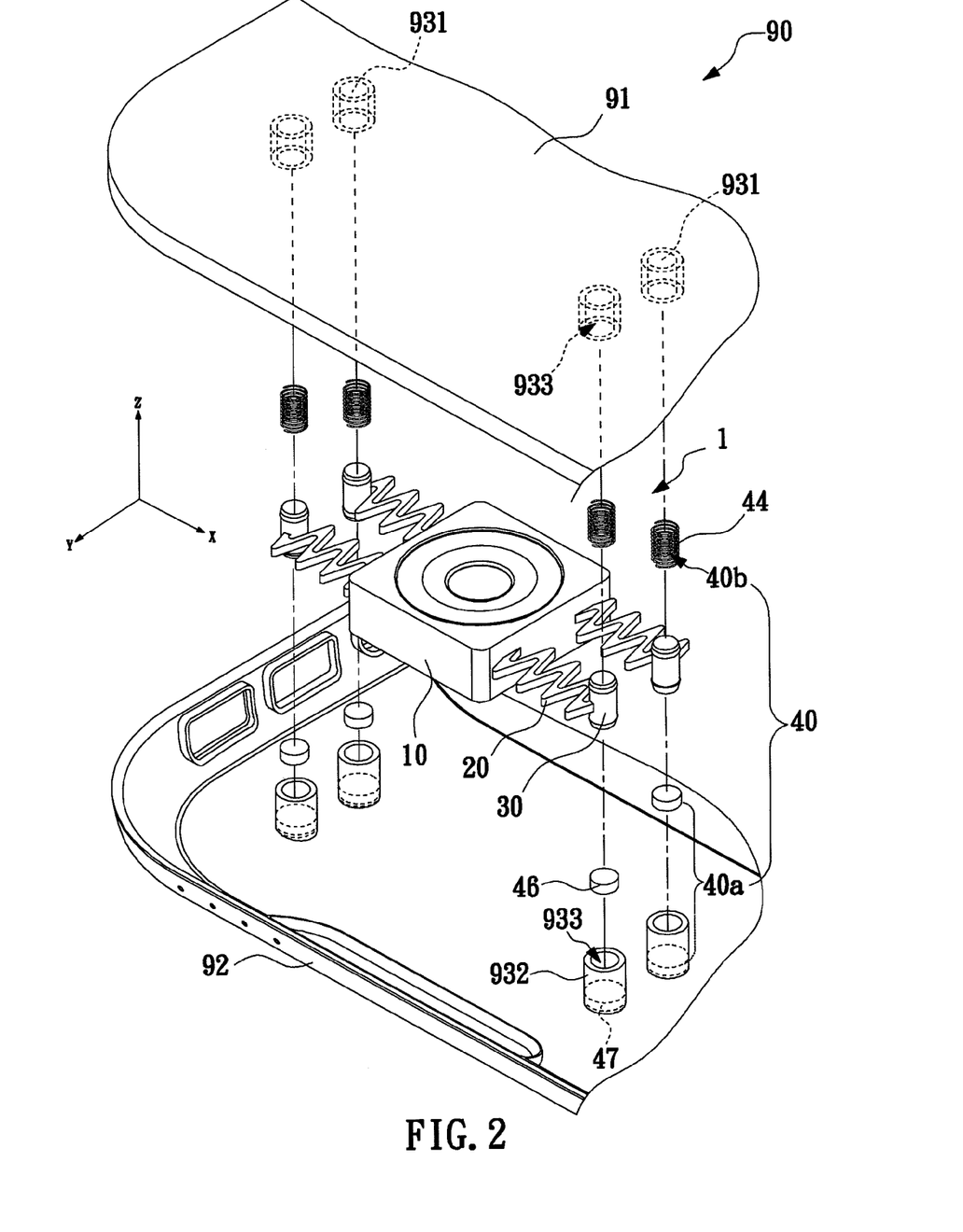
FIG. 2 illustrates an exploded view of the speaker device according to the first embodiment of the present invention.
Figure 3:
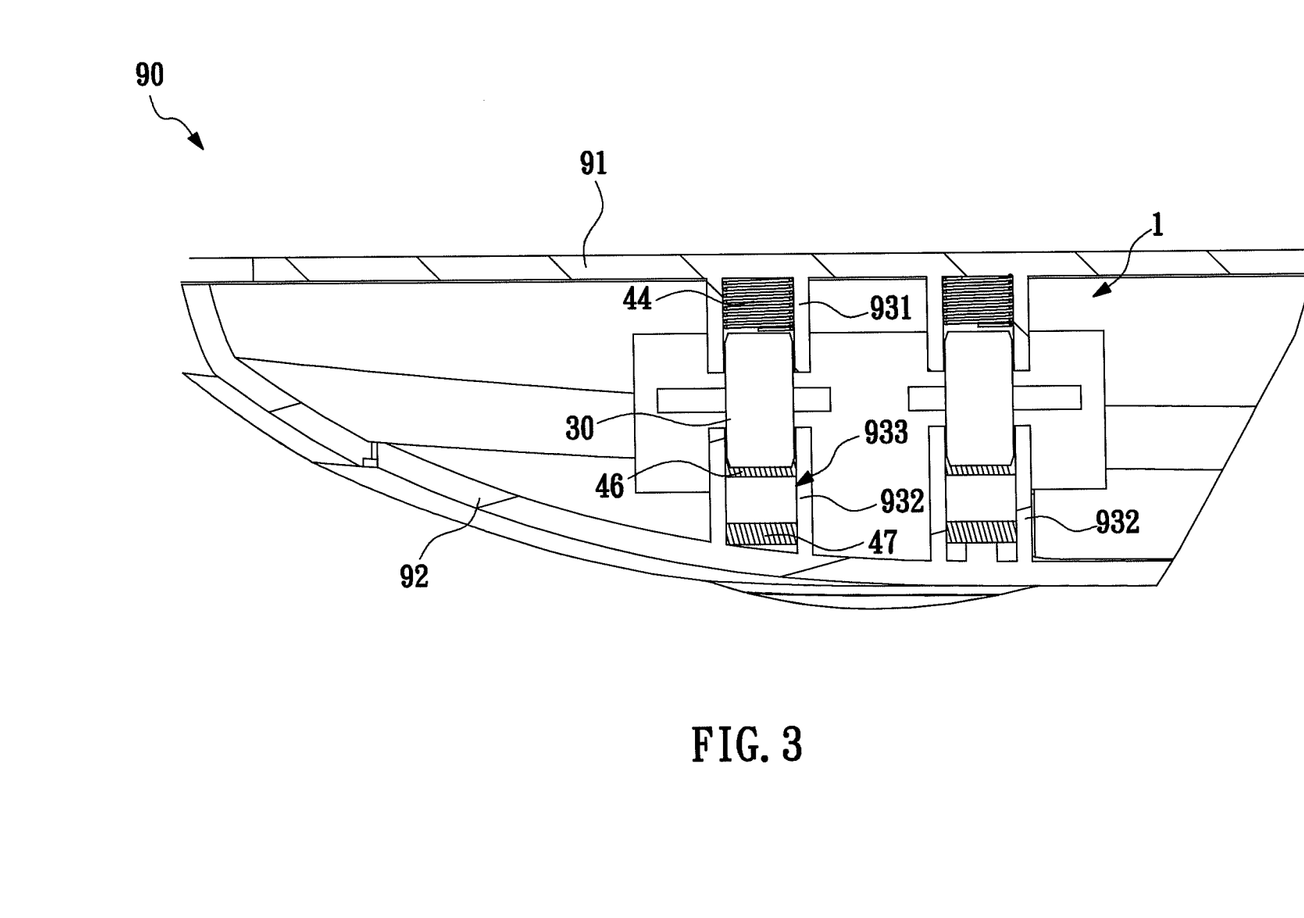
FIG. 3 illustrates a lateral cross-sectional view along an A-A direction as shown in FIG. 1.

Please refer to FIGS. 1-3 showing structural schematic drawings regarding a first embodiment of the present invention. FIG. 1 illustrates a schematic drawing of a speaker device according to the first embodiment of the present invention; FIG. 2 illustrates an exploded view of the speaker device according to the first embodiment of the present invention; and FIG. 3 illustrates a lateral cross-sectional view along an A-A direction as shown in FIG. 1.

As shown in FIG. 1 and FIG. 2, in the first embodiment of the present invention, the speaker device 1 of the present invention is mounted in an electronic device 90. The electronic device 90 comprises an upper cover 91 and a lower cover 92 combined with each other, and a plurality of positioning elements 93. Each of the positioning elements 93 comprises an upper positioning member 931 and a lower positioning member 932. The upper positioning member 931 is mounted to the upper cover 91, and the lower positioning member 932 is mounted to the lower cover 92 corresponding to each upper positioning member 931. In one embodiment of the present invention, each positioning element 93 (including the upper positioning member 931 and the lower positioning member 932) is a positioning tube having an accommodation space 933. In one embodiment of the present invention, the electronic device 90 of the present invention is a laptop computer, and the upper cover 91 and the lower cover 92 are respectively the upper cover and the lower cover of a base of the laptop computer; however, please note that the scope of the present invention is not limited to the above description. As shown in FIG. 2, the speaker device 1 comprises a speaker main body 10, at least one pair of buffer arms 20, a plurality of fixing elements 30, and a plurality of buffer members 40.

As shown in FIG. 2, in the first embodiment, single ends of the at least one pair of buffer arms 20 are respectively and symmetrically connected to two opposite sides of the speaker main body 10. In one embodiment of the present invention, the number of the buffer arms 20 can be two at each side as shown in FIG. 2, but can also be one at each side. The quantity of the buffer arms 20 of the present invention is not limited thereto. The shape of the buffer arm 20 is a non-linear curved shape, and preferably has two or more bending points. For example, the shape of the buffer arm 20 can be a zigzag shape, a sigmoid shape, a continuous sine wave form, or a continuous square wave form. By means of the curved shape design that not only is retractable along the X direction but also can shake or even twist on the X-Y plane, vibration energy generated by the speaker main body 10 along the X and Y directions can be effectively absorbed, thereby reducing the amplitude of the vibration energy transmitted to the fixing element 30.

The plurality of fixing elements 30 are respectively connected to the other end of each of the buffer arms 20, and can be sleeved between each of the corresponding lower positioning members 932 and upper positioning members 931, so as to fix the speaker main body 10 in the electronic device 90. In the embodiment of the present invention, the fixing element 30 is a cylinder-shaped fixing cylinder for being sleeved onto the accommodation space 933 of each positioning element 93 for moving up and down.

The buffer member 40 is mounted between the fixing element 30 and the upper positioning members 931 or the lower positioning members 932. The structure and shape of the buffer member 40 may vary with various different designs or combinations as long as the vibration energy possibly generated along the Z direction between the fixing element 30 and the upper and lower positioning members 931,932 can be absorbed. Each of the buffer members 40 can be divided into a first buffer body 40a located at a lower position and a second buffer body 40b located at an upper position according to their corresponding positions.

As shown in FIG. 2 and FIG. 3, in the first embodiment of the present invention, the first buffer body 40a comprises a first magnet 46 and a second magnet 47, and the second buffer body 40b is a spring 44. The spring 44 is accommodated in the accommodation space 933 located in the upper positioning member 931 of the upper cover 91. The spring 44 can utilize its own elastic compression and deformation force to relieve the amplitude of the vibration of the speaker device 1 along the Z direction, thereby reducing the force through which the fixing element 30 impacts the upper cover 91. The first magnet 46 is connected to a bottom end of the fixing element 30, and the second magnet 47 is accommodated in the accommodation space 933 located in the lower positioning member 932. The magnetisms of the opposing surfaces of the first magnet 46 and the second magnet 47 are the same; therefore, the repelling force generated due to two identical magnetisms can provide a magnetic force to relieve the force through which the fixing element 30 impacts the lower cover 92.

Figure 4:
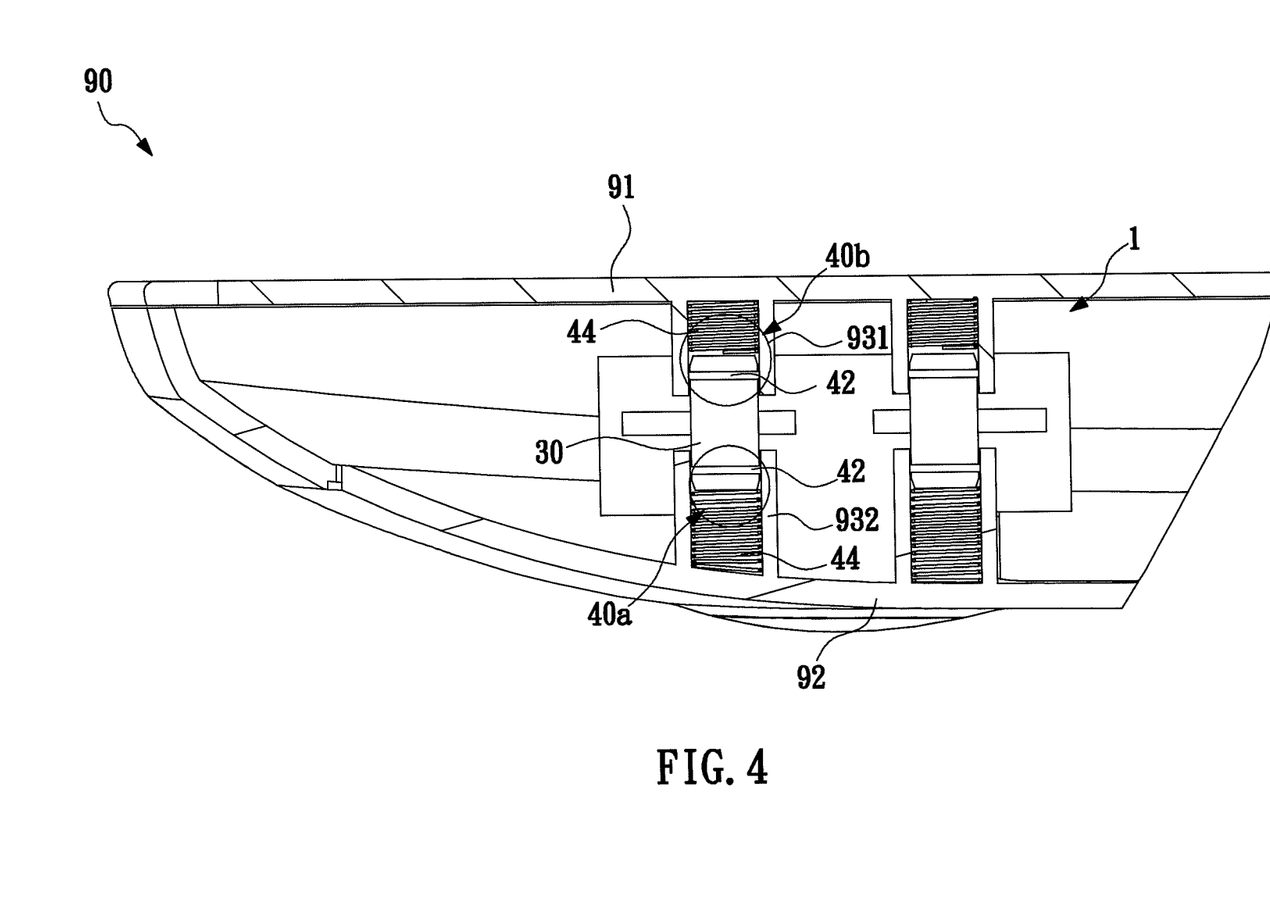
FIG. 4 illustrates a lateral cross-sectional view according to a second embodiment of the present invention.

Next, please refer to FIG. 4, which illustrates a lateral cross-sectional view according to a second embodiment of the present invention.

As shown in FIG. 4, in the second embodiment of the present invention, each of the first buffer bodies 40a and the second buffer bodies 40b of the buffer members 40 respectively comprises an airtight ring 42 and a spring 44. Each of the springs 44 is mounted in the accommodation space 933 located in the lower positioning member 932 and the upper positioning member 931. The airtight rings 42 located at top and bottom ends of the fixing elements 30 are used for respectively sealing the interior space of the upper positioning member 931 and sealing the interior space of the lower positioning member 932 to generate an airtight effect, such that when the fixing element 30 generates the vibration along the Z axle, the air in the accommodation space 933 will be compressed, thereby generating a pneumatic-type vibration-absorbing effect. The difference between this and the first embodiments is that this embodiment utilizes the spring 44 and the airtight ring 42 to replace the first magnet 46 and the second magnet 47 for achieving the buffer and vibration-preventing function, such that this embodiment can achieve the same buffer effect as the first embodiment does by means of utilizing air pressure and the elasticity of the spring 44 to relieve the vibration between the upper and lower positioning members 931,932 located in the upper cover 91 and the lower cover 92 and the fixing element 30. In the second embodiment of the present invention, the speaker main body 10, the plurality of buffer arms 20, and the plurality of fixing elements 30 are all the same as those disclosed in the first embodiment; therefore, there is no need for further description.

Figure 5:
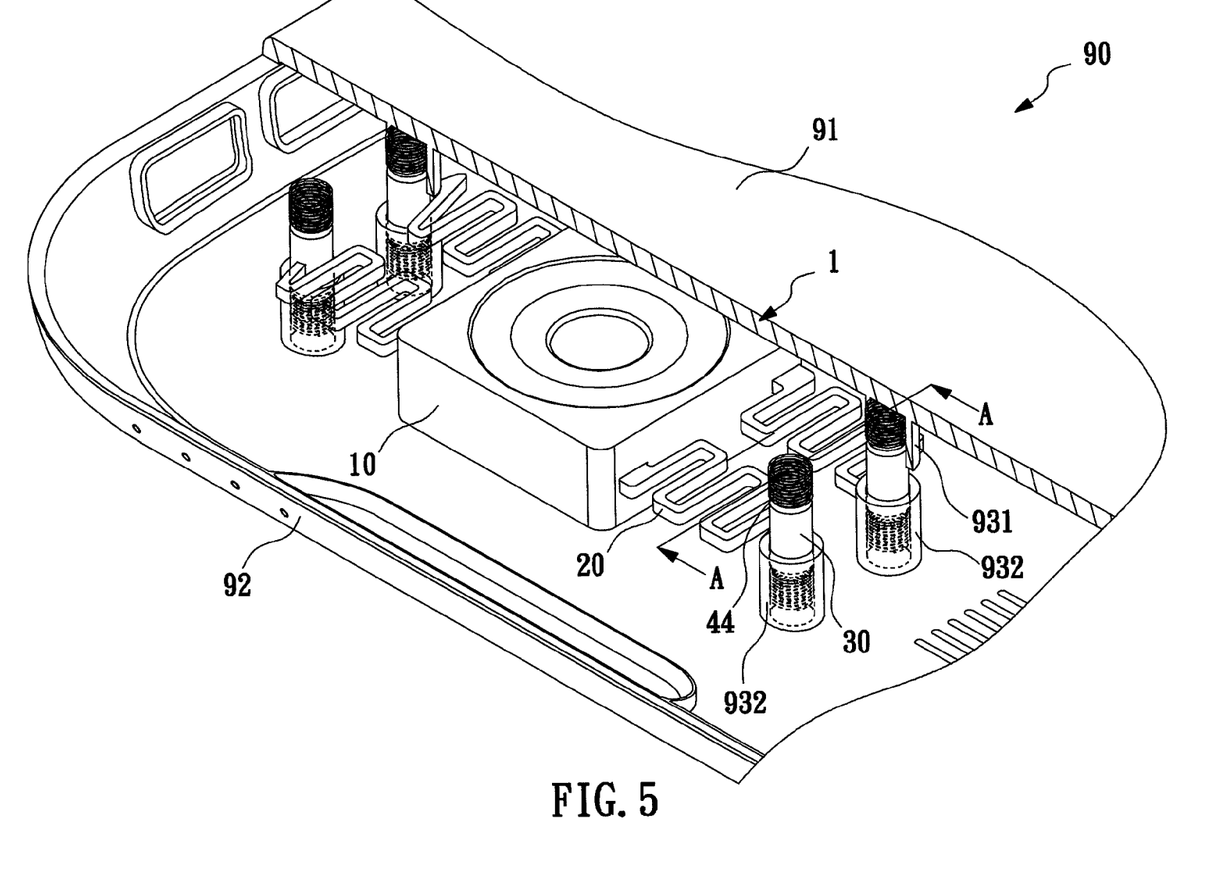
FIG. 5 illustrates a schematic drawing of the speaker device according to a third embodiment of the present invention.
Figure 6:
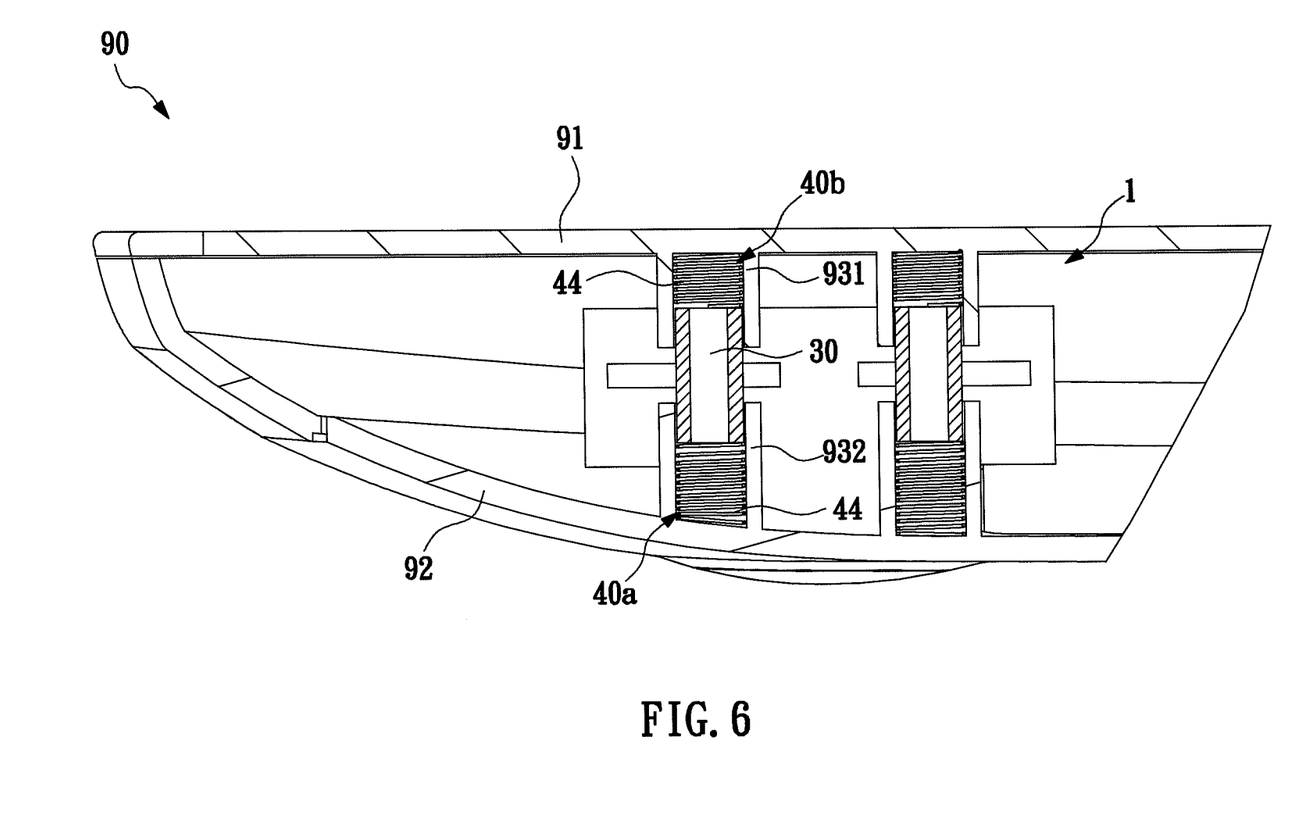
FIG. 6 illustrates a lateral cross-sectional view along an A-A direction as shown in FIG. 5.

Finally, please refer to FIG. 5 and FIG. 6 regarding a third embodiment of the present invention. FIG. 5 illustrates a schematic drawing of the speaker device according to the third embodiment of the present invention, and FIG. 6 illustrates a lateral cross-sectional view along an A-A direction as shown in FIG. 5.

As shown in FIG. 5, in the third embodiment of the present invention, the shape of the buffer arm 20 of the speaker device 1 of the present invention is in a square wave form. According to the square wave form design, the buffer arm 20 can achieve the same effect as the first embodiment does. As shown in FIG. 6, in the third embodiment of the present invention, no airtight ring 42 is used in each of the buffer members 40. The first buffer body 40a located at the lower position and the second buffer body 40b located at the upper position both utilize the springs 44 to relieve the up-and-down vibration of the speaker device 1 for achieving a certain vibration-preventing effect as well.

Please note that although the present invention has been explained in relation to its preferred embodiments, it is to be understood that many other possible modifications and variations can be made without departing from the spirit and scope of the invention as hereinafter claimed. For example, in the first embodiment, the first magnet 46 can be connected to a top end of the fixing element 30, and the second magnet 47 can be mounted to the accommodation space 933 located in the upper positioning member 931. More specifically, the first buffer body 40*a* and the second buffer body 40*b* of the same buffer member 40 can either be the same structure or different structures, and can be selected from one of the following or the combination thereof: a spring, an airtight ring and a magnet. However, please note the scope of the present invention is not limited to the above description; other equivalent buffer elements known by those skilled in the art can be utilized as well. Furthermore, the shape of the buffer arm 20 is not limited to a zigzag shape or in a square wave form; any shape, material or structural design that can achieve a vibration-preventing effect can be applicable for the buffer arm 20 of the present invention.

In conclusion, the features of the present invention are completely different from those of the prior art in terms of objectives, means, and effects. However, it should be noted that the above embodiments are illustrative of the principle and effect of the present invention only, and should not be interpreted as restrictive of the scope of the present invention. Hence, persons skilled in the art can make modifications and changes to the aforesaid embodiments without violating the technical principle and spirit of the present invention. Accordingly, the extent of legal protection for the rights claimable toward the present invention should be defined by the appended claims.

What is claimed is:

1. A speaker device, mounted in an electronic device, the electronic device including a plurality of positioning elements, the speaker device comprising:
   a speaker main body;
   at least one pair of buffer arms, one end of each of the buffer arms is connected to the speaker main body, and the pair of buffer arms are respectively and symmetrically located at opposite sides of the speaker main body;
   a plurality of fixing elements, respectively connected to the other end of each of the buffer arms, and movably combined with each of the positioning elements so as to fix the speaker main body; and
   a plurality of buffer members, respectively mounted between each of the fixing elements and each of the positioning elements, such that when the speaker main body generates vibration, each of the buffer arms and each of the buffer members absorb energy to reduce the amplitude of the vibration transmitted to the electronic device.

2. The speaker device as claimed in claim 1, wherein the electronic device comprises an upper cover and a lower cover combined with each other, the plurality of positioning elements comprise a plurality of upper positioning members and a plurality of lower positioning members, where each of the upper positioning members is mounted to the upper cover, and each of the lower positioning members is mounted to the lower cover corresponding to each of the upper positioning members, so as to combine each of the fixing elements and each of the buffer members therein.

3. The speaker device as claimed in claim 1, wherein each of the positioning elements is a positioning tube having an accommodation space, and each of the fixing elements is a cylinder-shaped fixing cylinder capable of being sleeved onto each of the positioning tubes for moving up and down.

4. The speaker device as claimed in claim 3, wherein each of the buffer members is mounted between each of the fixing cylinders and each of the positioning tubes.

5. The speaker device as claimed in claim 4, wherein each of the buffer members comprises an airtight ring mounted to an end portion of the fixing cylinder so as to properly seal air between each of the fixing cylinders and each of the positioning tubes.

6. The speaker device as claimed in claim 4, wherein each of the buffer members comprises at least one spring accommodated between each of the fixing cylinders and each of the positioning tubes.

7. The speaker device as claimed in claim 4, wherein each of the buffer members comprises a first magnet and a second magnet, the first magnet is mounted to one end of the fixing cylinder, the second magnet is mounted in the positioning tube at a corresponding location, and the magnetisms of opposing surfaces of the second magnet and the first magnet are the same.

8. The speaker device as claimed in claim 2, wherein each of the buffer members comprises an upper buffer body and a lower buffer body, the upper buffer body is mounted between the fixing element and the upper positioning member, and the lower buffer body is mounted between the fixing element and the lower positioning member.

9. The speaker device as claimed in claim 8, wherein the upper buffer body and the lower buffer body are the same buffer structure.

10. The speaker device as claimed in claim 8, wherein the upper buffer body and the lower buffer body are different buffer structures.

11. The speaker device as claimed in claim 1, wherein the shape of each of the buffer arms is a non-linear curved shape.

12. The speaker device as claimed in claim 11, wherein the shape of each of the buffer arms is selected from one of the following: a zigzag shape, a sigmoid shape, a sine wave form, and a square wave form.

13. An electronic device, comprising:
    a plurality of positioning elements; and
    a speaker device, comprising:
      a speaker main body;
      at least one pair of buffer arms, one end of each of the buffer arms is connected to the speaker main body, and the pair of buffer arms are respectively and symmetrically located at opposite sides of the speaker main body;
      a plurality of fixing elements, respectively connected to the other end of each of the buffer arms, and movably combined with each of the positioning elements so as to fix the speaker main body; and
      a plurality of buffer members, respectively mounted between each of the fixing elements and each of the positioning elements, such that when the speaker main body generates vibration, each of the buffer arms and each of the buffer members absorb energy to reduce the amplitude of the vibration transmitted to the electronic device.

14. The electronic device as claimed in claim 13, wherein the electronic device comprises an upper cover and a lower cover combined with each other, the plurality of positioning elements comprises a plurality of upper positioning members and a plurality of lower positioning members, where each of the upper positioning members is mounted to the upper cover, and each of the lower positioning members is mounted to the lower cover corresponding to each of the upper positioning members, so as to combine each of the fixing elements and each of the buffer members therein.

15. The electronic device as claimed in claim 13, wherein each of the positioning elements is a positioning tube having an accommodation space, and each of the fixing elements is a cylinder-shaped fixing cylinder capable of being sleeved onto each of the positioning tubes for moving up and down.

16. The electronic device as claimed in claim 15, wherein each of the buffer members is mounted between each of the fixing cylinders and each of the positioning tubes.

17. The electronic device as claimed in claim 16, wherein each of the buffer members comprises an airtight ring mounted to an end portion of the fixing cylinder so as to properly seal air between each of the fixing cylinders and each of the positioning tubes.

18. The electronic device as claimed in claim 16, wherein each of the buffer members comprises at least one spring accommodated between each of the fixing cylinders and each of the positioning tubes.

19. The electronic device as claimed in claim 16, wherein each of the buffer members comprises a first magnet and a second magnet, the first magnet is mounted to one end of the fixing cylinder, the second magnet is mounted in the positioning tube at a corresponding location, and the magnetisms of opposing surfaces of the second magnet and the first magnet are the same.

20. The electronic device as claimed in claim 14, wherein each of the buffer members comprises an upper buffer body and a lower buffer body, the upper buffer body is mounted between the fixing element and the upper positioning member, and the lower buffer body is mounted between the fixing element and the lower positioning member.

21. The electronic device as claimed in claim 20, wherein the upper buffer body and the lower buffer body are the same buffer structure.

22. The electronic device as claimed in claim 20, wherein the upper buffer body and the lower buffer body are different buffer structures.

23. The electronic device as claimed in claim 13, wherein the shape of each of the buffer arms is a non-linear curved shape.

24. The electronic device as claimed in claim 23, wherein the shape of each of the buffer arms is selected from one of the following: a zigzag shape, a sigmoid shape, a sine wave form, and a square wave form.

* * * * *